Sept. 12, 1939.  R. H. POWELL  2,172,405
VEHICLE BODY CONSTRUCTION
Filed March 16, 1937  2 Sheets-Sheet 1
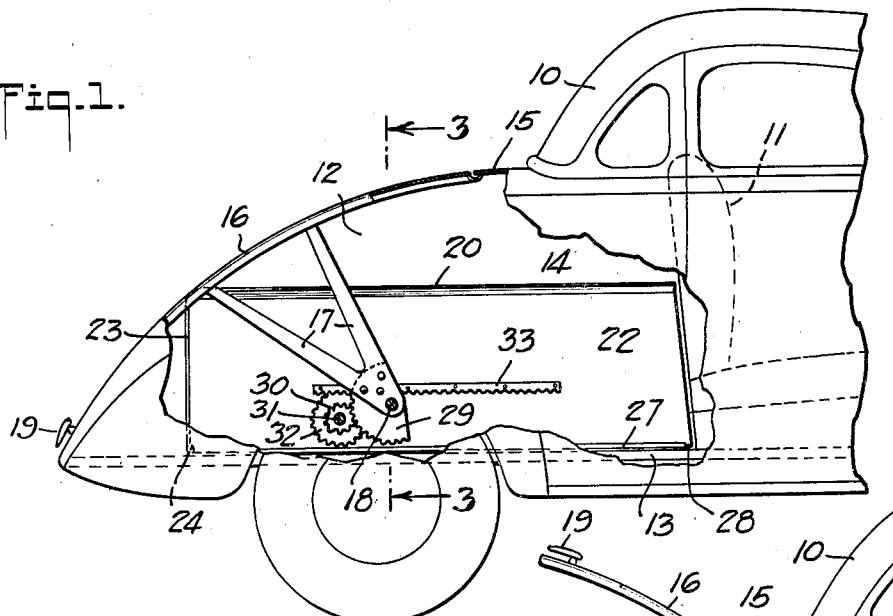
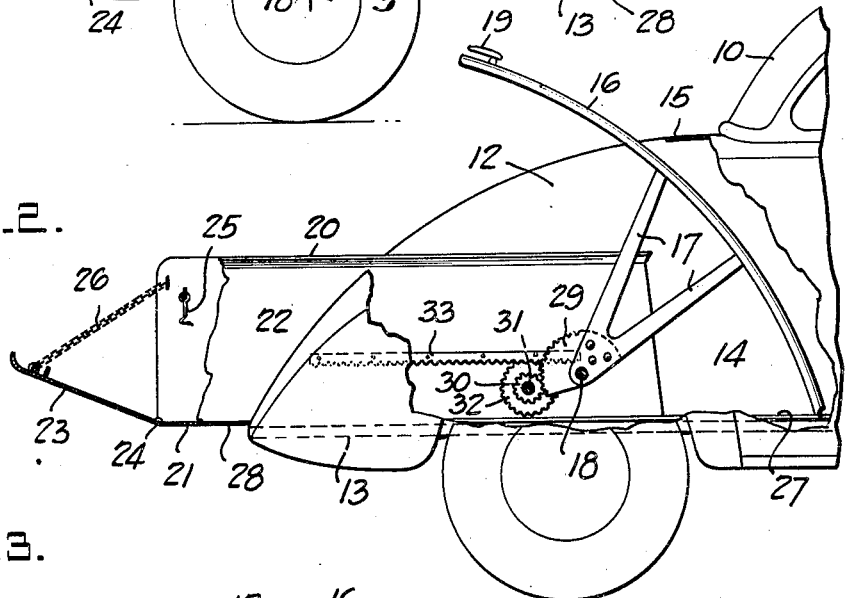
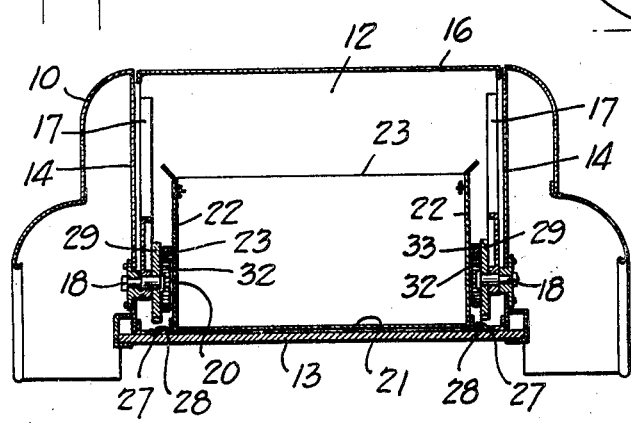
INVENTOR
RALPH H. POWELL
BY
ATTORNEYS Sept. 12, 1939.  R. H. POWELL  2,172,405
VEHICLE BODY CONSTRUCTION
Filed March 16, 1937  2 Sheets-Sheet 2
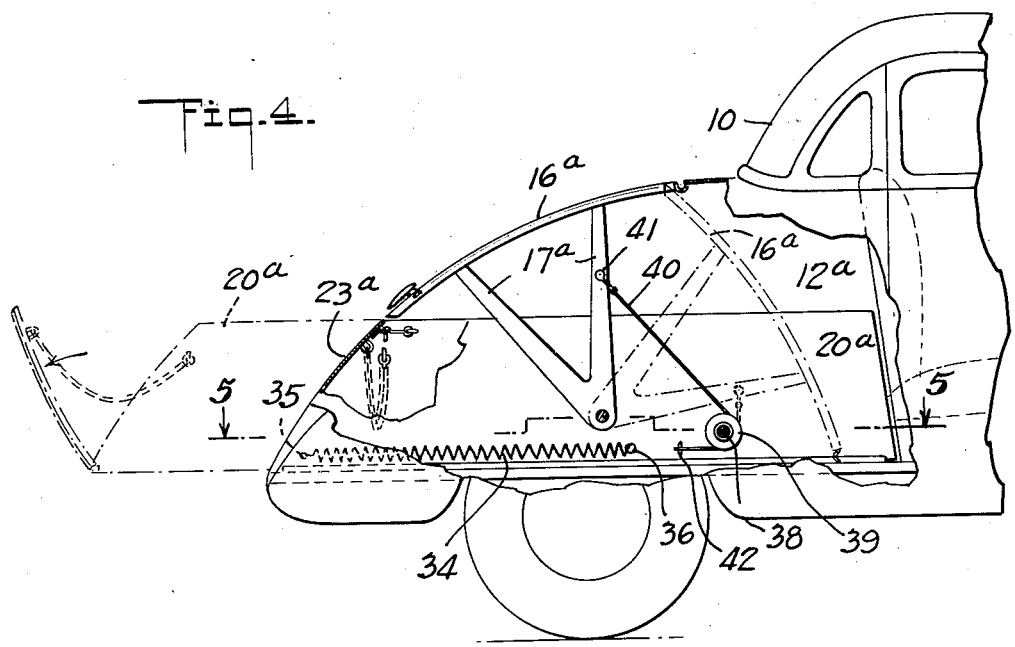
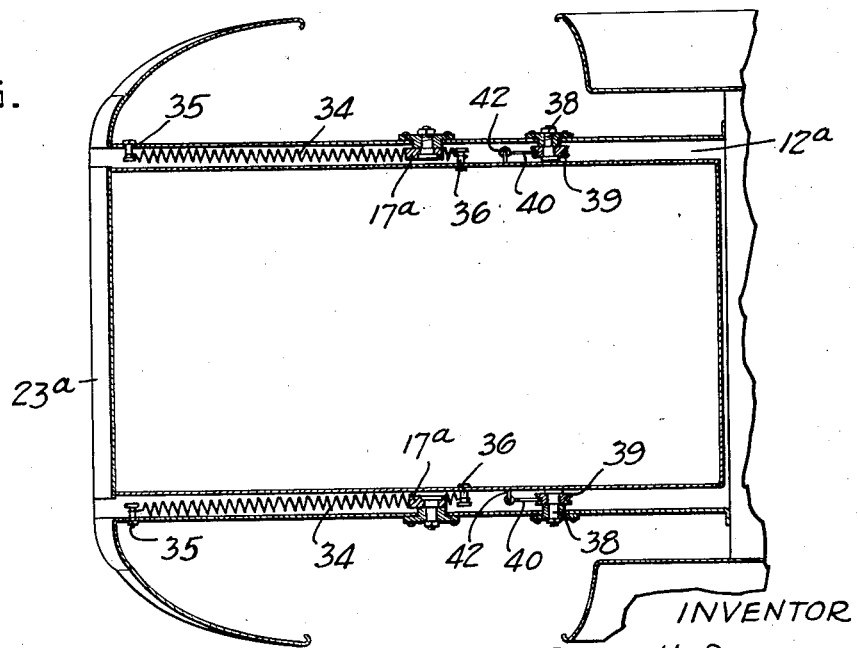
INVENTOR
RALPH H. POWELL
BY
Muun, Anderson & Liddy
ATTORNEYS Patented Sept. 12, 1939

2,172,405

UNITED STATES PATENT OFFICE 2,172,405

VEHICLE BODY CONSTRUCTION

Ralph H. Powell, Los Angeles, Calif.

Application March 16, 1937, Serial No. 131,142

3 Claims. (Cl. 296—26)

This invention relates generally to bodies for motor vehicles, and more particularly to those types of pleasure car bodies provided with an enclosed storage space at the rear thereof to which access is had upon opening a suitable closure.

An object of this invention is to provide a vehicle body with which means is associated to enable the capacity of the storage space to be greatly enlarged while being readily accessible for loading and unloading operations, all without in any manner detracting from or altering the exterior appearance and design of the body when the enlarged storage space is not in use.

Another object of the invention is to provide a vehicle body wherein the storage space thereof has associated therewith a movable load supporting section, the movement of which is co-ordinated with the movement of the closure for the storage space, all in such manner that according as the closure occupies open or closed position, the movable section will occupy a projected or retracted position, to accordingly co-act with the storage space in greatly enlarging its capacity or be concealed within the storage space so as not to alter the exterior appearance and design of the body.

With these and other objects in view, the invention consists in the combinations and arrangements of elements as set forth in the following specification and particularly pointed out in the appended claims.

In the accompanying drawings,

Figure 1 is a view in side elevation, partly broken away, and illustrating one form of vehicle body construction embodying this invention;

Figure 2 is a view similar to Figure 1, and showing the storage space as enlarged by the invention;

Figure 3 is a transverse sectional view taken on the line 3—3 of Figure 1.

Figure 4 is a view similar to Figure 1, and showing a modified form of vehicle body construction embodying the invention;

Figure 5 is a horizontal sectional view taken on the line 5—5 of Figure 4.

Referring to the drawings, and particularly to Figures 1 to 3, inclusive, the invention for the purpose of illustration is shown associated with an automobile body 10 of the coupe type, the portion thereof rearwardly of the seat 11 providing a storage space 12 defined by a floor 13 and side walls 14—14 rising therefrom and leaving the storage space open from the level of the floor 13 to the highest point of the curved deck 15. The storage space is thus open rearwardly and upwardly of the body, and this opening is adapted to be closed by a cover 16 conforming to the deck curvature of the body and pivotally mounted by pairs of arms 17—17 upon pintles 18—18 secured to the side walls 14—14 of the body, as shown in Figure 3.

By means of a handle 19 the cover 16 can be swung from the closed position shown in Figure 1 to the open position shown in Figure 2, wherein the cover is disposed in the forward portion of the storage space 12 so as to leave the latter unobstructed for access from the rear and sides of the body.

Coacting with the storage space 12 is a means for enlarging the capacity thereof, which comprises a movable load supporting section 20 in the form of a drawer, the bottom of which defines a platform 21 from which rises side walls 22—22 spaced from the body side walls 14—14, and a rear end wall 23 hinged at 24 to the platform and adapted to function as a tail board. The end wall 23 can be retained in its raised position by a suitable catch 25, and in its lowered position by a limiting chain 26.

By means of longitudinal guideways 27—27 on the floor 13 receiving guide strips 28—28 on the side walls 22, the section is mounted in the body at substantially the level of the floor 13 for movement rectilinearly from the retracted position within the storage space 12, as shown in Figure 1, to the projected position shown in Figure 2, wherein the section provides a rearward continuation of the storage space 12 and thus co-acts therewith to greatly enlarge the load carrying capacity thereof.

For the purpose of co-ordinating the movements of the cover or closure 16 and the section 20 in such manner that the section will be moved to projected or retracted position accordingly as the cover is opened or closed, the following operative connection is provided. Segmental gears 29—29 are fixed to the arms 17—17 and are concentrically mounted freely on the pintles 18—18 to constantly mesh with pinion gears 30—30 freely mounted on pintles 31—31 secured to the body side walls 14—14. Also freely mounted on the pintles 31 are relatively large gears 32—32 which are fixed to the respective pinion gears 30 and constantly mesh with rack bars 33—33 fixed to the side walls 22 of the section 20 so that the angular movement of the cover from one extreme position to another will be multiplied and converted into rectilinear movement of the section in the aforestated relationship.

When the cover is closed, the section is entirely concealed thereby within the storage space so that the exterior appearance of the vehicle body is not detracted from. Furthermore, it will be noted that the cover in its closed position tends to remain therein, under the weight of the cover rearwardly of the pintles 18 so as to maintain the section 20 retracted, as shown in Figure 1, and that in its open position the cover tends to remain open under its weight forwardly of the pintles 18 so as to maintain the section projected as shown in Figure 2.

Reference will now be had to Figures 4 and 5 which show a modified form of operative connection between the closure 16a and the load supporting section 20a. This operative connection comprises coil springs 34—34 disposed between the side walls of the section 20a and the storage space 12a and secured at one end to the vehicle body as indicated at 35—35. At their other ends the springs are secured to the section 20a as indicated at 36—36 so that with the springs loaded when the section occupies its retracted position shown in full lines in Figure 4 the springs will urge the section to its projected position shown in broken lines in this figure.

Journaled on the side walls of the storage space by means of pintles 38—38 are pulleys 39—39 over which are trained, cables 40—40 secured at one of their ends to the arms 17a of the cover 16a as indicated at 41—41. The cables are secured at their other ends to the side walls of the section 20a adjacent the forward end thereof, as indicated at 42—42 so that when the cover is closed the cables will maintain the section 20a in its retracted position. However, upon opening the cover the springs 34 will take up the resulting slack in the cables and concurrently move the section to its projected position. Thus the movements of the cover and section are co-ordinated so that the section will be moved to projected position by the springs or to retracted position by the cables according as the cover is opened or closed.

The cover 16a can be identical in construction to the cover 16 so as to completely close the opening of storage space, or, as shown in Figure 4, can terminate at the top of the section 20a when fully retracted. the rear wall 23a of the section providing a smooth continuation of the cover to conform to the curvature of the deck 15 and thus not detract from the exterior appearance of the body.

From the foregoing description, it will be manifest that the invention provides simple and substantial means by which a pleasure type automobile body can be adapted to the convenient carrying of loads of relatively large bulk in commercial or other use, by the simple operation of opening the cover for the storage space, and that when the cover is closed, the original appearance of the body is restored by the automatic retraction and concealment of the section 20 or 20a within the storage space.

I claim:

1. A vehicle body having a storage space; a closure movably mounted on the body to open or close said storage space; a load supporting section movably mounted on the body to project from the storage space or be retracted thereinto; and means operatively connecting the closure to said section by which the movement of one is co-ordinated with the other to cause the section to be projected when the cover is opened and be retracted when the cover is closed; said section having a rear wall co-acting with the closure to close the storage space when the section is retracted.

2. A vehicle body having a floor and side walls coacting to define a rearwardly and upwardly opening storage space; a closure for said storage space, mounted on the body to occupy a closed position or an open position wherein the closure is disposed forwardly in the storage space; a load supporting section having a rear end wall and side walls spaced from said side walls of the body; means mounting said section on the body for movement to occupy a retracted position in the storage space or a projected position wherein the section forms a rearward continuation of the storage space; and means disposed between the side walls of the body and section, operatively connecting the latter to the closure for movement of the section to projected or retracted position according as the closure is opened or closed.

3. A vehicle body having a rearwardly opening storage space at the rear end thereof; a cover for closing the opening of said storage space; means pivotally mounting said cover to occupy a closed position or an open position wherein the closure is disposed forwardly in the storage space; a load supporting section; means mounting said section in the storage space to occupy a retracted position therein or a projected position wherein the section forms a rearward continuation of the storage space; and means operatively connecting the closure and said section, by which the latter will be projected or retracted according as the closure is opened or closed; the pivotal mounting of the closure being in the storage space at a location for the closure when open, to leave the load supporting section unobstructed for access from above and from the rear of the vehicle body, by disposing the closure in advance of the forward end of said section in the storage space.

RALPH H. POWELL.